(12) United States Patent
Pilu

(10) Patent No.: US 7,548,256 B2
(45) Date of Patent: Jun. 16, 2009

(54) IMAGE PROCESSING SCHEME

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 10/960,157

(22) Filed: Oct. 7, 2004

(65) Prior Publication Data

US 2005/0104971 A1    May 19, 2005

(30) Foreign Application Priority Data

Oct. 18, 2003   (GB)   ................................ 0324430.8

(51) Int. Cl.
*H04N 5/228*   (2006.01)
(52) U.S. Cl. .................... 348/208.3; 348/208.4; 396/52
(58) Field of Classification Search . 348/208.99–208.6, 348/159, 208.3; 386/117; 396/52–55; 382/260; 600/519
See application file for complete search history.

(56) References Cited

U.S. PATENT DOCUMENTS

| | | | | |
|---|---|---|---|---|
| 5,502,484 A * | 3/1996 | Okada | ..................... | 348/208.6 |
| 6,414,715 B1 * | 7/2002 | Sato | ..................... | 348/207.99 |
| 6,809,758 B1 * | 10/2004 | Jones | ..................... | 348/208.99 |
| 6,865,226 B2 * | 3/2005 | Xie et al. | ............... | 375/240.08 |
| 2003/0058340 A1 * | 3/2003 | Lin et al. | ..................... | 348/159 |
| 2003/0144597 A1 * | 7/2003 | Bock | ..................... | 600/519 |
| 2003/0235342 A1 * | 12/2003 | Gindele | ..................... | 382/260 |
| 2004/0001705 A1 * | 1/2004 | Soupliotis et al. | ........... | 386/117 |

OTHER PUBLICATIONS

"Transformed Hidden Markov Models: Estimating Mixture models of Images and Inferring Spatial Transformations in Video Sequences," Jojic, Petrovic, Frey, and Huang, Proceedings of the IEEE Conference on Computer Vision and Pattern Recognition 2000, IEEE Computer Society Press, Los Alamatos, CA.*
UK Search Report dated Mar. 9, 2004.

* cited by examiner

*Primary Examiner*—Tuan V Ho
*Assistant Examiner*—Dennis Hogue

(57) ABSTRACT

A method for processing an image sequence captured using an image capture device, wherein a captured sequence to be stabilized by estimating motion of the device, abstracting data from the image sequence, stabilizing the image sequence in response to the estimated motion of the device, and forming an output image sequence from the stabilized image sequence and the abstracted data.

29 Claims, 12 Drawing Sheets

IMAGE PROCESSING SCHEME

TECHNICAL FIELD

The present invention relates, in general, to the field of image stabilization, and more specifically to a method and apparatus for the preservation and synthesis of movement data in a stabilized image sequence.

CLAIM TO PRIORITY

This application claims priority to copending United Kingdom utility application entitled, "Image Processing Scheme," having serial no. GB0324430.8, filed Oct. 18, 2003, which is entirely incorporated herein by reference.

BACKGROUND

In general, it is desirable for images or a sequence of images (hereinafter referred to as a "video sequence") captured using an image capture device to be processed, either during capture, or when viewed or played back using video equipment. The processing will generally take the form of filtering or correction of the image or video sequence in order to remove undesirable elements such as motion blur, for example, which may be caused by movement of the image capture device during the capture procedure.

Such processing is termed 'image stabilization', and is the process which allows an image or video sequence to be captured, stored or rendered with a reduced (or eliminated) amount of apparent motion caused by the secondary, unintentional motion of the image or video sequence capture device with respect to the scene or object being captured, whilst preserving the dominant, intentional motion of the capture device. The image or video capture device could be a camera (digital or other), or a camcorder (digital or other), or generally, any device capable of capturing an image or sequence of images for storage in the device or elsewhere.

Several classes of image stabilization methods exist, viz. mechanical, electromechanical, optical and electronic. The above stabilization methods are well established and documented, and will not, therefore, be described in any further detail.

Recently, interest in the use of user-wearable image capture devices has resulted in the above stabilization methods being applied to the images captured therefrom. Such a user-wearable device may have stabilization functionality built-in, or may rely on stabilization of captured image data being carried out in another system distinct from the device itself.

The nature of a user-wearable image capture device implies that any images captured from it will be intrinsically 'noisy' due to motion and vibrations introduced to the device (and hence images captured therefrom) by a user's movements, intentional or unintentional. Such 'noisy' image data may best be characterized as data which includes a secondary (to the data of the scene or object to be captured), undesirable element such as a low-frequency element in a video sequence due to a user walking or running, for example, or a high-frequency element in a video sequence due to a user travelling in a vehicle, for example. It will be appreciated that further types of undesirable data may be introduced into image data due to device rotation etc.

In order to reduce the problem of 'noisy' image data, the above-mentioned stabilization methods have been applied to captured sequences. For example, U.S. Pat. No. 5,502,484 describes a shake detection and correction method for use in video cameras and video signal reproducing apparatus. Further, U.S. Pat. No. 5,253,071 describes a method and apparatus for stabilizing an image produced in a video camera.

A problem associated with the above stabilization techniques, especially when applied to user-wearable image capture devices or portable capture devices where a video sequence is to be captured, is that any intentional movement data which forms part of the video sequence data to be stabilized will be filtered out in the process of image stabilization, especially since the amplitudes of motions associated with such intentional movements are generally smaller than the induced unintentional 'background' motion of the capture apparatus.

In U.S. Pat. No. 5,253,071, the start and stop of intentional panning or tilting is detected. A vibration detection signal is cancelled during a period between detection of the start of intentional panning or tilting and detection of the stop of the intentional panning or tilting. Thus, stabilization is switched off when intentional motion is detected.

The preservation of intentional movement data is important since, during consumption for example, such intentional movements allow someone viewing a video sequence to be able to 're-live' a situation as experienced by the user of the device.

SUMMARY

According to a first exemplary embodiment there is provided a method of processing an image sequence, the method comprising estimating motion of the device, abstracting data from the image sequence, stabilizing said image sequence in response to the estimated motion of the device, and forming an output image sequence from the stabilized image sequence and the abstracted data.

According to a second embodiment, there is provided a method of processing an image sequence comprising a plurality of image frames, the method comprising estimating relative motion between said image frames, abstracting data from the image sequence, stabilizing said image sequence in response to the estimated motion, and forming an output image sequence from the stabilized image sequence and the abstracted data.

According to a third exemplary embodiment there is provided a computer program product for use with a computer, said computer program product comprising a computer useable medium having computer executable program code embodied thereon, wherein said product is operable, in association with said computer, to process an image sequence by estimating motion of the device, abstracting data from the image sequence, stabilizing said image sequence in response to the estimated motion of the device, and forming an output image sequence from the stabilized image sequence and the abstracted data.

BRIEF DESCRIPTION OF THE DRAWINGS

The components in the drawings are not necessarily to scale relative to each other. Like reference numerals designate corresponding parts throughout the several views, and reference is made to the following figures in which.

It should be emphasised that the term "comprises/comprising" when used in this specification is taken to specify the presence of stated features, integers, steps or components but does not preclude the presence or addition of one or more other features, integers, steps, components or groups thereof.

DETAILED DESCRIPTION

Figure 1:
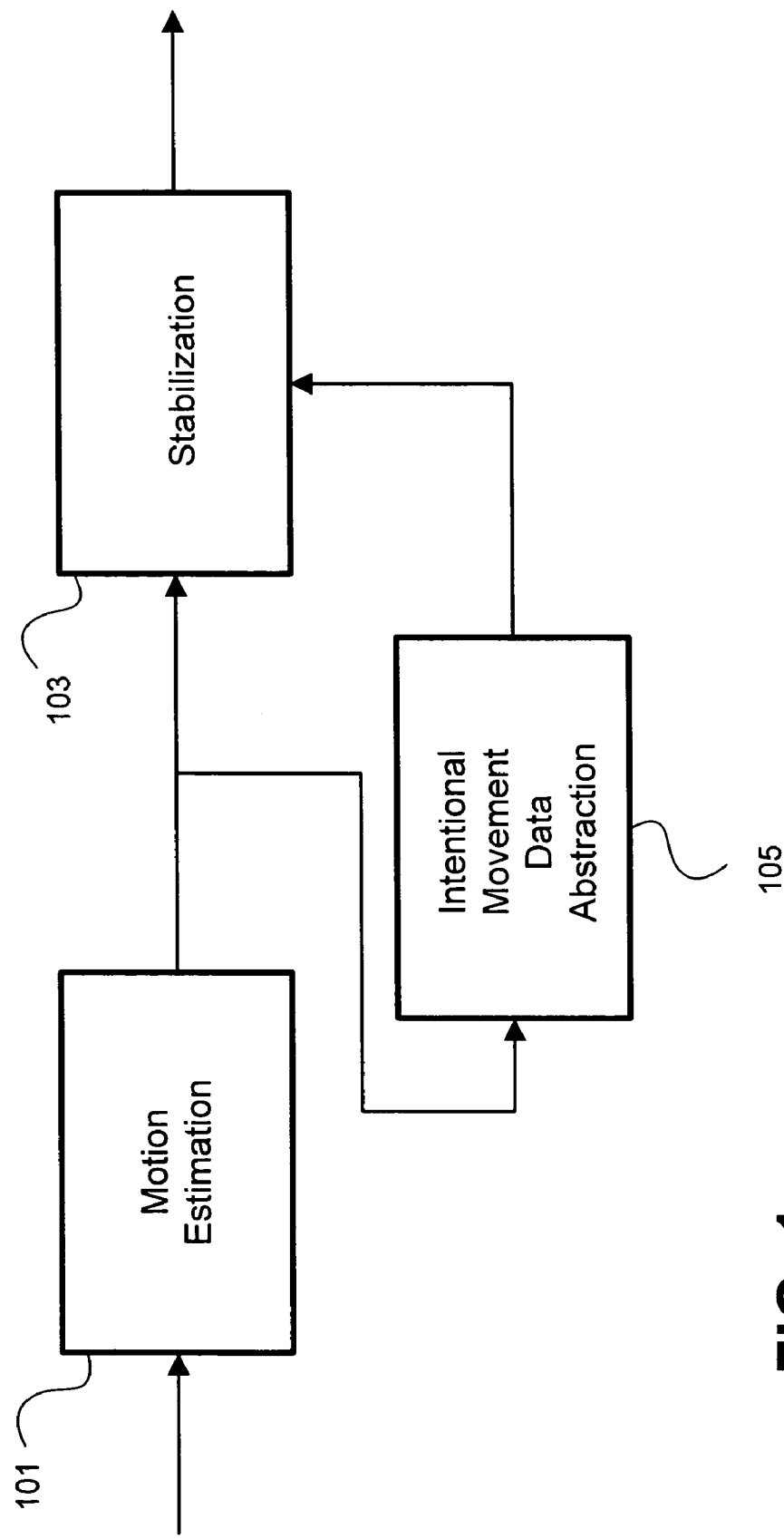
FIG. 1 is a diagrammatic representation of an embodiment.

FIG. 1 shows a diagrammatic representation of an exemplary first embodiment. Image sequence data which is to be processed, and which has been captured using an image capture device (not shown) such as a user-wearable camera, a camcorder or the like, is input to a motion estimation module 101. The motion estimation module 101 is operable to perform an estimation of the movement of the image capture device using either image-based or mechanical estimating means, for example. Accordingly, the motion of the device may be inferred from the image sequence data using interframe displacements, or may rely on mechanical means such as inertial sensors within the device itself, for example. Such motion estimation modules, electrical, mechanical, or other, and the techniques used therein to estimate the motion of a device, are well known and documented, and will not, therefore, be described in any further detail. Various embodiments will function using any of a number of suitable prior art motion estimation systems.

It will be appreciated by those skilled in the art that the motion estimation module 101 may either be an integral part of the device itself (e.g., integral inertial sensors and image compensators for example) as described below with reference to FIG. 2, or may form part of a system external to the image capture device, which system is operable to process image data captured by the device as described below with reference to FIG. 3.

Once the device motion has been estimated using the estimation motion module 101, the resultant image data is passed to the 'stabilization module' 103 and the 'movement extraction module' 105.

The movement extraction module 105 is operable to extract intentional movement data from the image data output from the motion estimation module 101. Again, it will be appreciated that the modules 103, 105 need not be integral to the capture device, and may form part of an external system.

Figure 2:
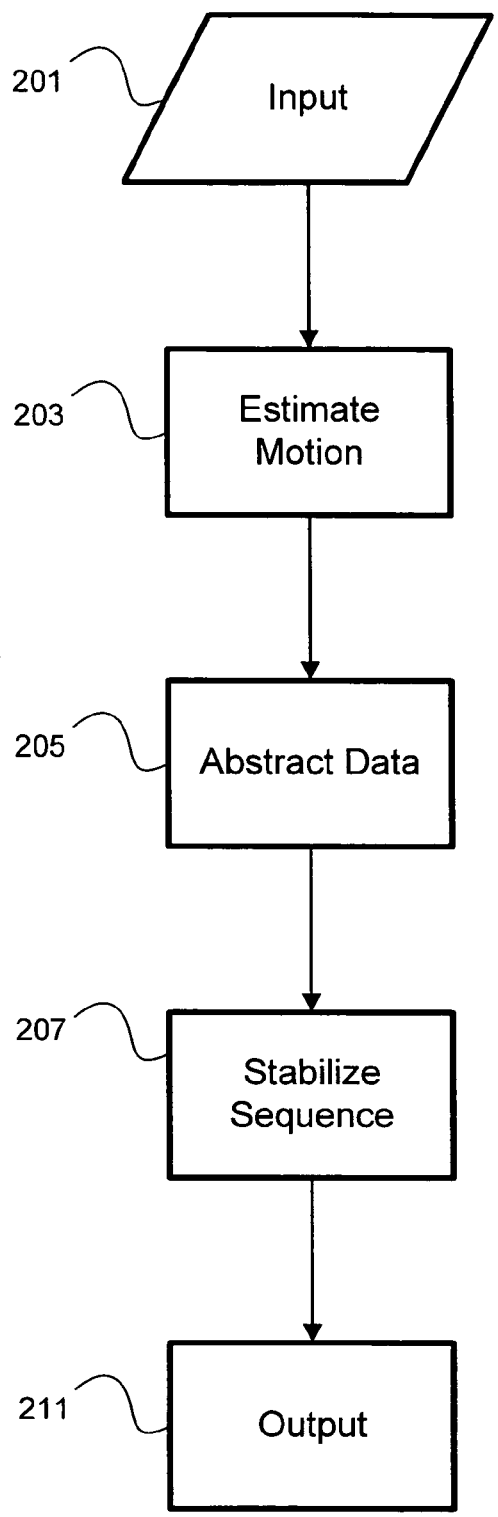
FIG. 2 is a flow chart in accordance with an embodiment.

FIG. 2 is a flow chart representing the method for processing an image sequence in accordance with an exemplary embodiment. The image sequence captured by means of the image capture device is input at step 201 of the method. The sequence will generally comprise a plurality of image frames.

At step 203, motion of the image capture device is estimated. The motion estimation may proceed using any of the above-mentioned techniques. For example, the motion estimation could proceed by comparing image frames of the sequence. Alternatively, a mechanically based motion estimation may be used as mentioned above. At step 205, image data from the sequence is abstracted. At step 207, the sequence is stabilized in response to the estimated motion of the device. The stabilization may proceed using any one of a number of techniques as will be described below. Following stabilization, an output image sequence is formed at step 211 from the stabilized sequence and the abstracted data.

Figure 3:
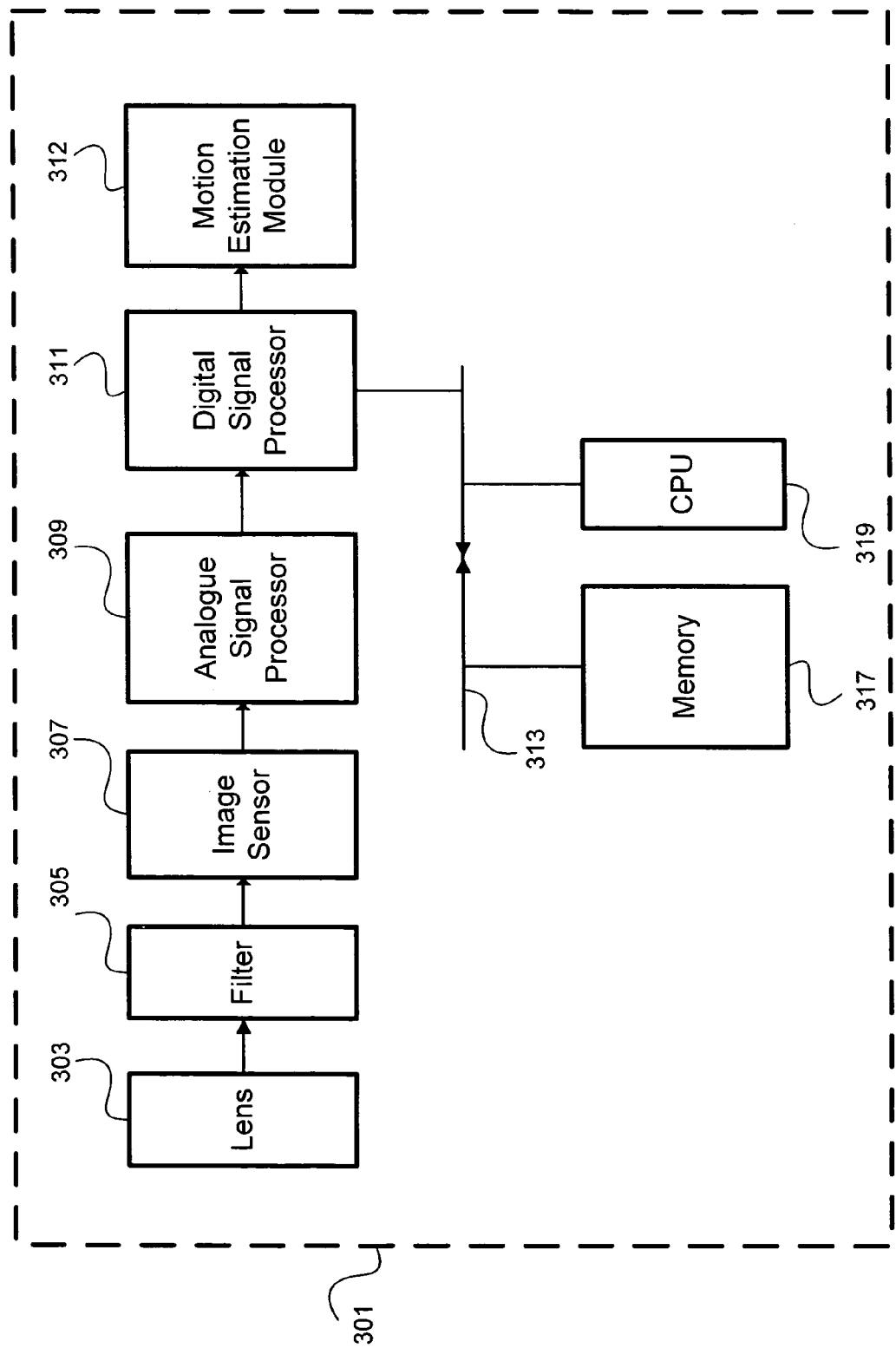
FIG. 3 is a diagrammatic representation of an image capture device embodiment.

FIG. 3 is a diagrammatic representation of an image capture device 301 with which various embodiments may be practiced, and which may independently operate according to the selected various embodiments. The device 301 comprises a lens assembly 303, a filter 305, image sensor 307, analogue signal processor 309, digital signal processor 311, and a motion estimation module 312. An image or scene of interest is captured from reflected light passing through the lens assembly 303. The light may be filtered using the filter 305. The image is then converted into an electrical signal by image sensor 307, which could be a CCD (charge-coupled device) or a CMOS (complementary metal oxide semiconductor) device, for example. This raw image data is then routed through an analog signal processor (ASP) 309. The raw image data is then passed to the digital signal processor (DSP) 311.

Further, with reference to the device 301 of FIG. 3, a bus 313 is operable to transmit data and/or control signals between the DSP 311, memory 317, and the central processing unit (CPU) 319.

Memory 317 may be dynamic random-access memory (DRAM) and may include either non-volatile memory (e.g. flash, ROM, PROM, etc.) and/or removable memory (e.g. memory cards, disks, etc.). Memory 317 may be used to store raw image digital data as well as processed image digital data. CPU 319 is a processor which can be programmed to perform various tasks associated with the device 301. In accordance with various embodiments, CPU 319, memory 317 and the motion estimation module 312 are further operable to estimate the motion of the device 301 using one of the image based estimating methods as described above. So, for example, image data stored in memory 317 is processed by CPU 319 in accordance with instructions stored in module 312 (which may be ROM or a programmable circuit assembly such as an FPGA (flexible programmable gate array), or any other suitable device for storing instructions to be executed in accordance with various embodiments).

It should be noted that there are many different configurations which can be used to practice the various embodiments. In one embodiment, the CPU 319, the module 312 and the DSP 311 reside on a single chip. In other embodiments, the CPU 319, module 312 and DSP 311 reside on two or more separate chips, for example. Further combinations in other embodiments are anticipated, but it should be noted that the exact architecture of the device 301 and/or the components therein as outlined above are not intended to be limiting, and are merely presented in order to exemplify a typical image capture device with which an embodiment is operable.

Figure 4:
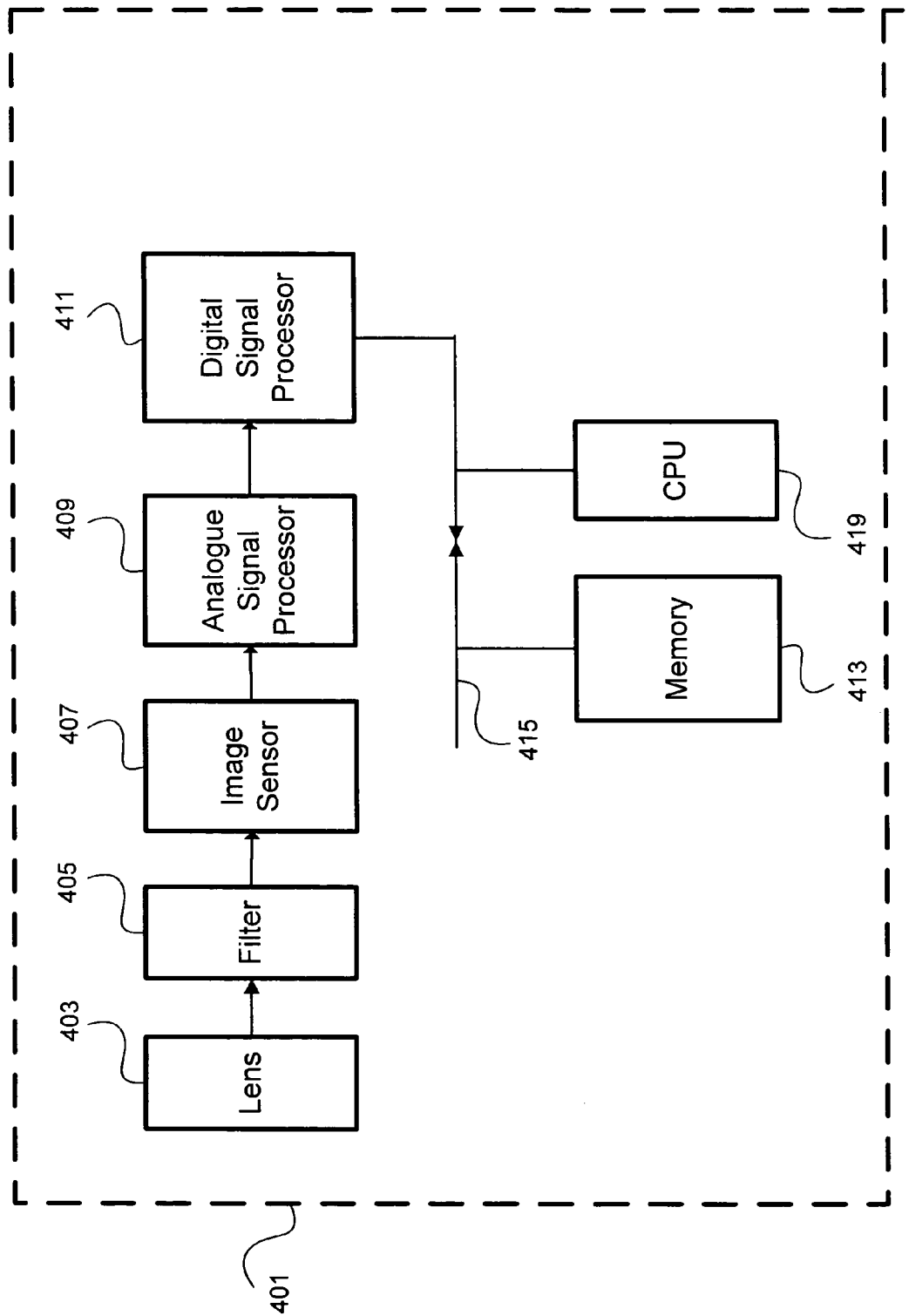
FIG. 4 is a diagrammatic representation of another image capture device embodiment.

FIG. 4 of the accompanying drawings is a diagrammatic representation of an image capture device 401 operable in accordance with an exemplary embodiment. The device 401 comprises a lens assembly 403, a filter 405, image sensor 407, analogue signal processor 409, and digital signal processor 411. An image or scene of interest is captured from reflected light passing through the lens assembly 403. The light may be filtered using the filter 405. The image is then converted into an electrical signal by image sensor 407 which could be a CCD (charge-coupled device) or a CMOS (complementary metal oxide semiconductor) device, for example. This raw image data is then routed through an analog signal processor (ASP) 409. The raw image data is then passed to the digital signal processor (DSP) 411. Memory 413 of the device 401 may be used to store raw image digital data as well as processed image digital data. Memory 413 may be dynamic random-access memory (DRAM) and may include either non-volatile memory (e.g., flash, ROM, PROM, etc.) and/or removable memory (e.g., memory cards, disks, etc.). A bus 415 is operable to transmit data and/or control signals between the DSP 411 and memory 413, central processing unit (CPU) 419. Again, it should be noted that the exact architecture of the device 401 and/or the components therein as outlined above are not intended to be limiting, and are merely presented in order to exemplify an exemplary image capture device with which an embodiment is further operable.

In contrast to the device 301 as outlined above with reference to FIG. 3, the device 401 contains no internal functionality which would enable it to perform the method of an embodiment independently. Accordingly, the device 401 is connected to external means (not shown) in order that captured image data may be processed in accordance with the method of various embodiments.

For example, the device may be connected to an external computer in order that captured image data may be processed using a computer (not shown). The processed data may then be passed back to the device 401 if necessary. The connection to the computer may be facilitated locally using a universal serial bus (USB) connection or similar, for example, or may be facilitated over an internet connection whereby the device 401 communicates with a geographically far removed computer or processing device using the TCP/IP protocol, or similar. The device 401 may also be able to connect to a computer or similar processing apparatus using a wireless radio frequency link such as an IEEE 802.11x (x=a, b or g) wireless data link, or Bluetooth®, for example.

It will be appreciated that the exact details of the data transfer link between the device 401 and the processing means are not significant, and that, accordingly, the methods employed by various embodiments may be applied internally within a device 301 as described above with reference to FIG. 3, or may be applied externally to the device 401 as described with reference to FIG. 4.

According to an exemplary embodiment, intentional movement data is detected from the motion data using a process using an intentional movement data detection model involving "Hidden Markov Models" (HMMs). The HMM is a statistical model where the system being modelled is assumed to be a 'Markov process' with unknown parameters (i.e., a random process whose future values are determined from its current values), and the problem is to determine the hidden parameters of the Markov model based on this assumption.

Intentional movement may include movement of the image capture device by a user in response to a scene or object of particular interest, for example, or may be characterised in a temporal sense wherein prolonged focus is given to a scene or object of interest. Alternatively, a combination of the temporal and spatial deviations in the video sequence may characterise the intentional movement data, such that a movement of a capture device and a prolonged focus is given to an object or scene of interest. Such intentional movements are therefore generally indicative of a user's interest in a particular scene or object being captured at the time of the movement, and therefore indicate attention clues in the captured image sequence.

An intentional movement characterising an attention clue therefore involves a change in the trajectory of the image capture device in response to a scene and/or object which is of interest to the user of the device.

It will be appreciated that the implementation of an exemplary embodiment does not require the intentional movement detection model to rely on the use of HMMs, and that these are presented merely as an alternative exemplary embodiment. Intentional movement data may be abstracted from the image sequence using any number of suitable techniques. For example, a rule based scheme may be implemented in hardware or software wherein data corresponding to a predetermined set of intentional movements is stored in a look-up table. It will be appreciated by those skilled in the art that other alternatives may also be implemented in order to provide the intentional movement detection model.

In order to determine intentional movement data from unstabilized captured image data by an exemplary embodiment, a set of HMMs must be provided for each possible intentional movement associated with a user's interest in a scene or object, and the case where the image data includes no intentional movements. These HMMs are then used to identify intentional movements of the device in question in response to a scene or object of interest in further video sequences. Such HMMs are obtained from 'training image data'. The training image data may be a pre-captured video sequence which includes a number of intentional movements associated with a scene or object of interest, and which it would be desirable to be able to detect in a video sequence proper, such as that obtained casually from a user-wearable camera, for example.

In an exemplary embodiment, the training image data comprises an approximately 30 minute long video sequence obtained using a user-wearable device. Such a training sequence may be provided from image data captured using any suitable image capture device such as a camcorder or digital camera with movie functionality, for example. Preferably, in order to be able to obtain a full set of HMMs, the sequence must contain both intentional movement data elements such as glances and prolonged user focus at scenes/objects of interest, for example, and elements which do not relate to intentional movements such as walking in a steady line without glancing or focusing intently on an object or scene of interest. Thus, it is possible to obtain information relating to both intentional movements- and 'normal' data from the training image data. In this connection, a full set of relevant HMMs may be obtained from the training data (as will be described below), and these HMMs will permit relevant intentional movements in further video sequences to be detected.

A distinct HMM may be required for each intentional movement, such as a glance from a user which translates into motion of the capture device, a set of two glances at the same object or scene (perhaps with the first being shorter than the second for example), or a prolonged focus on an object or scene and so on. In general, any spatial of temporal deviations in the sequence as described above could be flagged as relevant intentional movement data.

Accordingly, the training image data is studied, and such intentional movement data is flagged. Other intentional movement data may also be flagged depending on whether it is deemed to be desirable for future recognition in further captured sequences. The training image data, and any image data used or captured in accordance with the various embodiments, may be stored in the memory of an image capture device such as memories 317 and 413 of the devices 301, 401 as described above with reference to FIGS. 3 and 4 respectively, or may be stored externally from the device on a magnetic or optical storage medium for example, or any other suitable storage medium which permits the image data to be viewed and manipulated.

Figure 5:
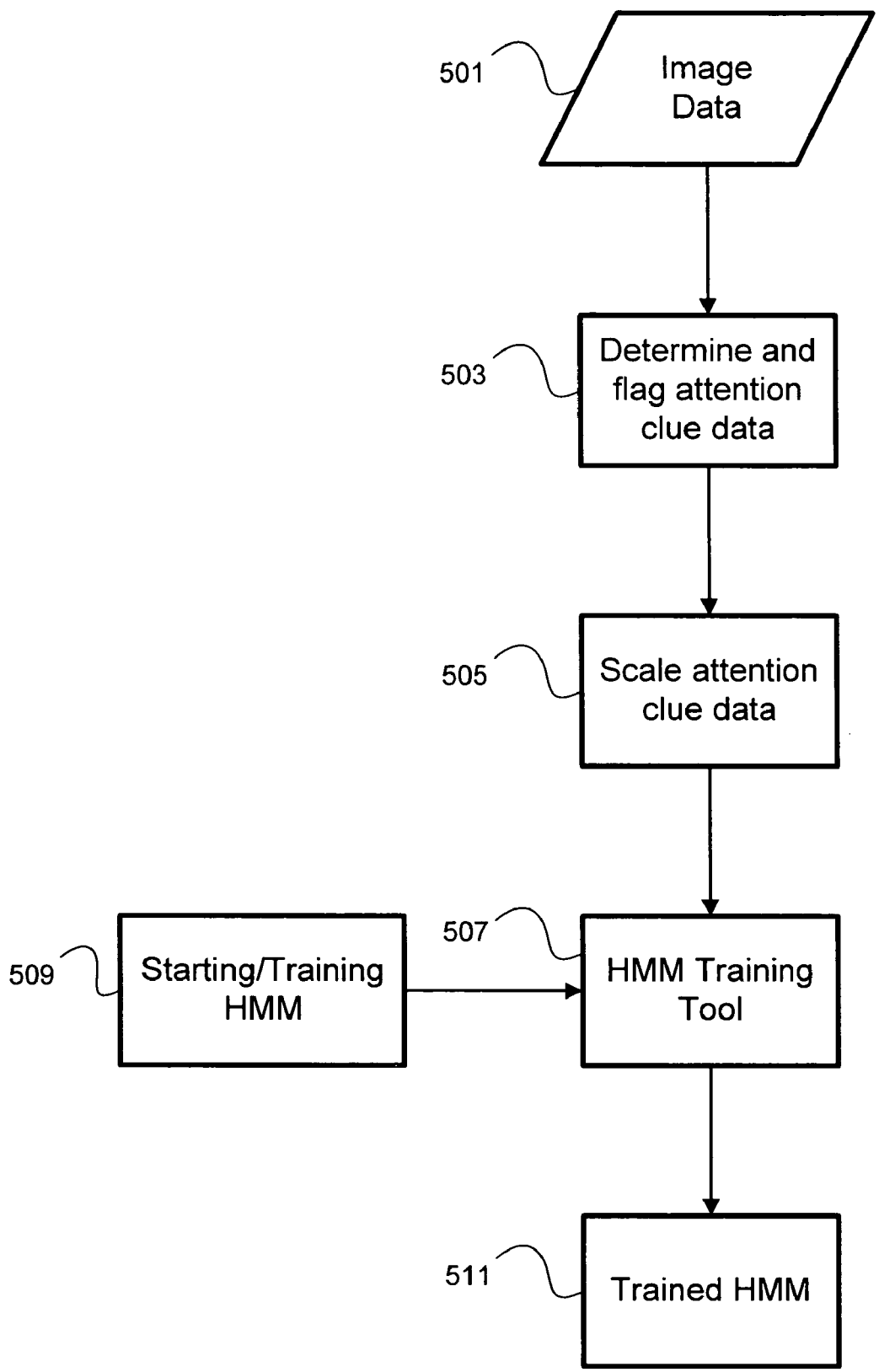
FIG. 5 is a flow diagram used by an embodiment.

FIG. 5 is a flow diagram representing the procedure taken to flag and process a section of training image data in order to obtain an HMM for that particularly identified intentional movement by various exemplary embodiments.

It should be noted that the procedure taken to flag and process image data in order to provide HMMs as exemplified in FIG. 5 (or indeed any intentional movement data models) is a process which need only occur once, or when additional HMMs relating to further intentional movements need to be added to the repository of existing HMMs. Such a process will generally be carried out by a person skilled in identifying and marking up such intentional movement (see below). It is therefore envisaged that any intentional movement data models (whether in the form of HMMs or other models) be provided ready for use, either encoded in hardware or software of a device in accordance with the various embodiments for example, thereby obviating the need for a user of any such device to manually process any data in order to provide intentional movement data models themselves.

In this connection, at step 503 of FIG. 5, image data from step 501 is studied and intentional movement data is flagged. The image data may be stored in a device or elsewhere as described above. Intentional movement data may be flagged by providing a suitable marker in the image data to indicate the beginning and end of such data. Such a marker may be characterised by the addition of suitable data into the original image data, or it may consist of a visual marker at the beginning and end of the relevant section of the sequence being studied. The marker serves as an aid to enable intentional movement data to be identified easily within the training data for utilisation in accordance with the various embodiments as will be described below. Additional detail regarding steps 507, 509 and 511 is provided hereinbelow.

In an exemplary embodiment, the training data is studied, and flags are placed manually to indicate the beginning and end of intentional movement data. It will be appreciated that a certain amount of automation is applicable when determining intentional movements from the training image data. For example, a suitably programmed microprocessor could automate the process of intentional movement data detection and flagging using suitable algorithms.

Figure 6:
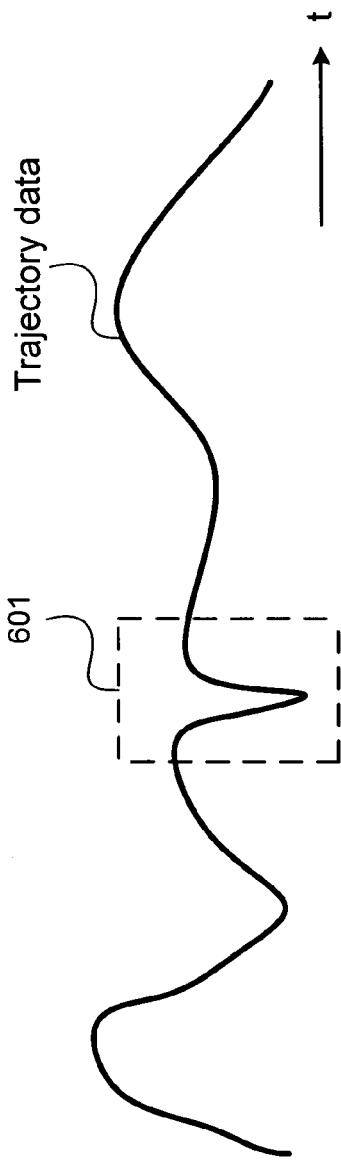
FIG. 6 is a graphical representation of the unstabilized trajectory of an image capture device against time.

FIG. 6 is a graphical representation of the unstabilized trajectory of an image capture device against time. For the sake of clarity, the graph of FIG. 6 has been limited to motion in one spatial dimension (e.g., horizontal motion with respect to time), but it will be appreciated that in reality an image capture device's trajectory will vary across three spatial dimensions with respect to time, and may also include additional components due to device rotation, for example. At each point in the trajectory, the device will have captured an image of a scene or object, and certain aspects of the trajectory data will provide an indication that intentional movement data is present. For example, the area 601 of FIG. 6 represents a significant deviation in the trajectory of the device, and could indicate motion of the capture device in response to an object or scene of interest. In order to determine if this does constitute a valid intentional movement, reference must also be made to the images captured at the time the deviation occurred (i.e., the images captured during the time of the deviation 601).

It will be appreciated that a certain degree of variability will be introduced when marking up the intentional movement data within the image data. For example, the interpretation of the beginning and end of an intentional movement may vary. This variability will not affect the performance of the embodiments, however, and providing that an intentional movement is substantially encompassed by the markers, the various embodiments will function.

Figure 7:
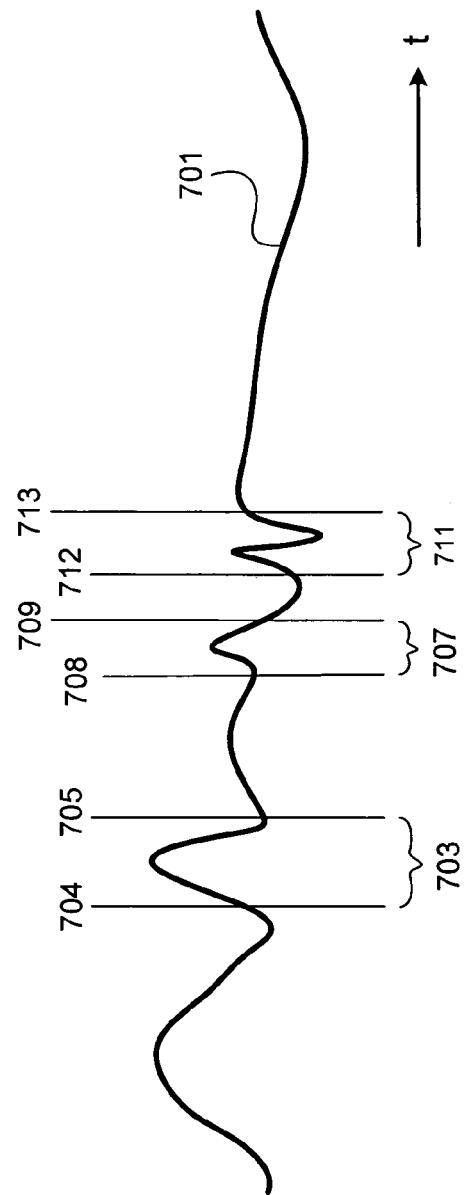
FIG. 7 is a diagrammatic representation of image data which has been marked up according to the method of an exemplary embodiment.

FIG. 7 is a diagrammatic representation of image data which has been marked up according to the method of an exemplary embodiment. The trajectory 701 of an image capture device is shown. This trajectory represents the movement of the device in one spatial dimension with respect to time. It will be appreciated that this is not intended to be limiting. Only one spatial dimension is considered for the sake of clarity, and to aid in the understanding of the embodiments. Further plots of the device trajectory in further spatial dimensions would also need to be marked up in order to obtain a full set of HMMs. The device may be a user wearable camera, a camcorder, digital camera, mobile phone with camera functionality, or any other similarly portable or fixed device capable of capturing and storing image data, which is operable to function in accordance with the embodiments as described herein.

The areas 703, 707 and 711 of FIG. 7 represent areas of the trajectory 701 identified as areas corresponding to intentional movements of the device, such as those corresponding to indications of interest in a particular scene or object. For clarity, only three such areas have been depicted in FIG. 7. In practice more or less of such areas would be present in the marked up data. Lines 704, 708, 712 and 705, 709, 713, respectively, represent the beginning and ends of the image data sections corresponding to the areas 703, 707 and 711. Such beginning and end markers are those manually placed in the training data in order to determine potential intentional movements therein. As can be seen from FIG. 7, the areas 703, 707 and 711 each represent a significant deviation in the trajectory of the device in comparison with the overall trajectory. When such areas are referenced against the images captured at these positions within the data, it can be determined if corresponding intentional movements of the device have occurred at these positions.

In practice, such deviations in trajectory may be less pronounced than those as exemplified by areas 703, 707 and 711. However, it will generally be possible to detect such intentional movement areas within the device trajectory data, particularly when reference is made to the images captured by the device.

Once intentional movement data in the image data has been identified and suitably marked up (i.e., flagged), it is copied into a suitable HMM training tool (see step 507 of FIG. 5). The HMM generation tool may be one of the standard tools which exist for generating HMMs from data input to them. In order to input the relevant data into the tool, it will generally be necessary for it to be scaled (see step 505 of FIG. 5) to a certain size (e.g., 64 samples) so that it may easily be processed.

Available tools for developing HMMs which require this scaling of input data may be found in MatLab®, for example. In the case of a video sequence, a sample could be a frame, for example, so that intentional movement data scaled to 64 samples will correspond to 64 frames of captured data. The above is not intended to be limiting, and is merely presented as an example to aid in the understanding of the various embodiments. Indeed, some HMM generation tools need not require that data input to them be scaled, and, as mentioned above, the use of HMMs is only included in order to exemplify the embodiments, and is not intended to be limiting as any number of suitable methods may be used in order to generate an intentional movement data model.

The standard tools for generating HMMs, such as those in MatLab® usually rely on iterative algorithms such as the expectation maximization (EM) algorithm, or the Baum-Welch algorithm, for example. For a general discussion of EM algorithms, and, in particular, the Viterbi algorithm (discussed later), the reader is referred to Rabiner, L., Juang B. (1986), An introduction to hidden Markov models, IEEE Acoustics, Speech & Signal Processing Magazine, 3, 4-16, and G. D. Forney, The Viterbi Algorithm, Proceedings of the IEEE 61(3) 1973, pp 268-278, both incorporated herein by reference.

In order to generate an HMM using an EM algorithm for example, a starting HMM is input to the HMM training tool (steps 507 and 509 of FIG. 5). The starting HMM and the input data then allow a trained HMM to be developed. According to an aspect of one exemplary embodiment, the starting HMM could be, for example, a five state, fully connected, equally weighted HMM. In general, starting (or training) HMMs will form part of the training tool, and no input need be required from a user in order to specify specifics of the starting HMM. Furthermore, it will be appreciated that the exact nature of the starting HMM need not be limited to that outlined above. Indeed a number of suitable alternatives would all provide broadly similar trained HMMs, each allowing embodiments to function in a substantially identical manner whichever starting HMM is chosen.

On the basis of the starting HMM, and the scaled intentional movement data, a trained HMM for the particular intentional movement in question is generated (step 511 of FIG. 5) using the standard tool. This process is repeated for every type of intentional movement flagged in the training image data so that an HMM is obtained for each type, and the process is also carried out in order to provide an HMM for data with no intentional movements for the situation where no intentional movements are present in a video sequence. This is accomplished by inputting scaled image data from the training image data into the HMM training tool which is devoid of any intentional movement data.

Therefore, according to the above process, a fully populated set of HMMs is obtained for categories of intentional movement detected in the training image data.

As mentioned above, it will be appreciated that the use of HMMs is presented merely in order to aid in the understanding of an aspect of various embodiments, and is not intended to be limiting. As mentioned, intentional movement data may be abstracted from the image sequence using any number of suitable techniques. For example, a rule based scheme may be implemented in hardware or software wherein data corresponding to a predetermined set of intentional movements is stored in a look-up table. It will be appreciated by those skilled in the art that other alternatives may also be implemented in order to provide the intentional movement detection model.

Figure 8:
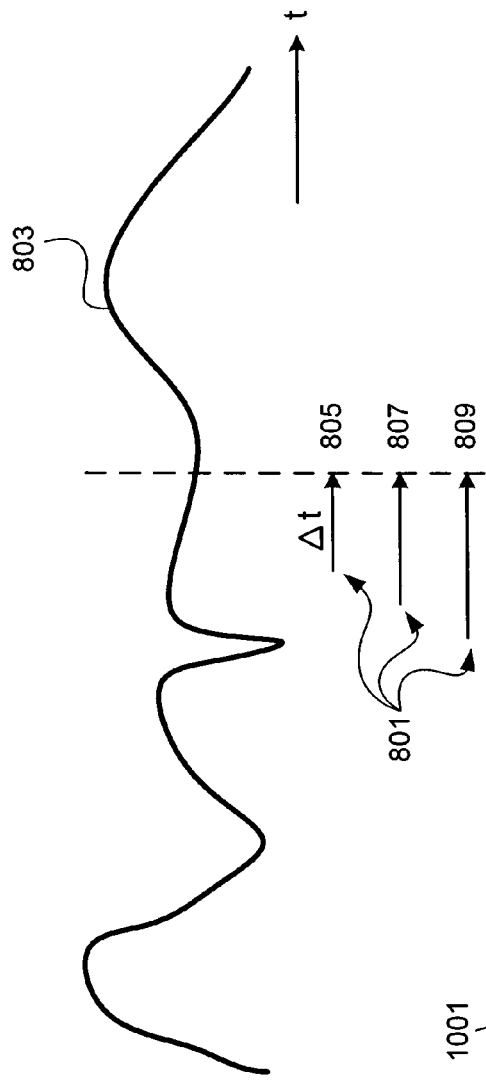
FIG. 8 is a further diagrammatic representation of image data processed by an exemplary embodiment.
Figure 9:
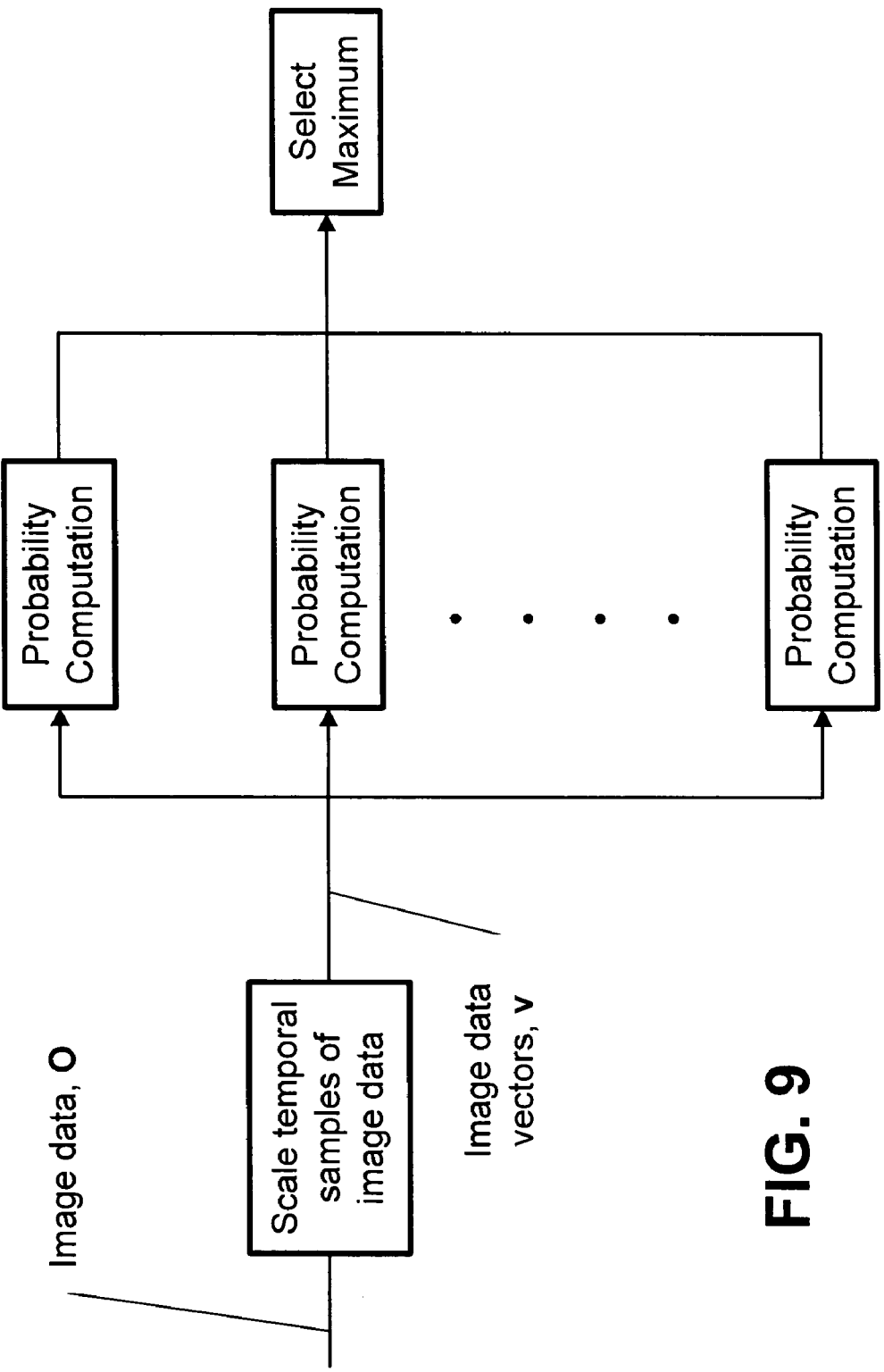
FIG. 9 is a diagrammatic representation of an alternative embodiment.

FIGS. 8 and 9 represent the process which is carried out according to an exemplary embodiment to detect intentional movements in a video sequence on the basis of the intentional movement HMMs generated using the process outlined above.

According to this exemplary embodiment, and with reference to FIG. 8, samples 801 of specific duration of a video sequence data proper 803 (i.e. not training data) are obtained. The samples 801 are preferably stored in a buffer, and may be taken at every frame of the sequence, or may be taken at some multiple of the frame rate such as every $2^{nd}$ frame of the video sequence, for example. The samples have different temporal scales as depicted in FIG. 8. The three samples depicted in FIG. 8 (805, 807 and 809) are samples of respectively increasing (temporal) size. It will be appreciated that only three samples have been depicted in FIG. 8 for the sake of clarity, and this is not intended to be limiting. The number of samples obtained from the data 803 will vary according to the nature of the data and the means available for storing the samples 801. Further, FIG. 8 is not to scale, and the relative sizes and/or scales of the data 803 and the samples 801 are merely presented as an aid to the understanding of the embodiments, and are not intended to be limiting.

It will be appreciated that the first sample may only be obtained at the point where t=Δt (where Δt is the width of the first sample), and therefore, a buffer is provided for storing image data so as to enable samples to be obtained from previously captured data. The buffer is able to store a certain amount of time of captured data which must be no less than the size of the largest sample to be stored.

Obtained samples 801 are scaled, preferably using standard interpolation techniques, to a specified temporal length, Δ, corresponding to a set number of frames of the video sequence. For example, each sample 801 may be scaled to a length corresponding to 64 frames of the sequence as depicted in FIG. 8.

Once the samples have been obtained, the process of determining any intentional movements within an image sequence proper can be initiated using the previously obtained set of HMMs, for example. The process to determine the presence of such intentional movement data in the sequence is depicted in FIG. 9.

Each scaled image data sample may be thought of as an image 'vector', v. With reference to FIG. 9, the image data sequence, O, is therefore split into the vectors v using the method as described above with reference to FIG. 8, i.e., each vector is one of the scaled temporal samples of the image sequence, O. Further, according to the process as described with reference to FIG. 5, each intentional movement, M, has an associated HMM, $\lambda^M$. Thus, given the set of sample vectors, v, and the set of HMMs, $\lambda^M$, a probability computation must be performed which maximises the likelihood that a given vector corresponds to an intentional movement as modelled by the $\lambda^M$ (which includes an HMM relating to no intentional movement). Such a probability computation is preferably carried out using a suitable algorithm such as the Viterbi algorithm. The Viterbi algorithm provides a way to find the most likely sequence of hidden states (or causes) that result in a sequence of observed events. Other suitable algorithms may also be used. The reader is referred to the above-mentioned references for a detailed discussion of the implementation of the Viterbi algorithm.

The output of the probability computation is the intentional movement whose model likelihood is the highest (or the output may show that no intentional movement was found in the observed data).

Therefore, each vector of the image data sequence is processed against each HMM using the Viterbi algorithm thereby allowing intentional movement data to be identified within the image data sequence.

Once the image data has been examined for intentional movements as described above, the image data may then be stabilized using the stabilization module 107 of FIG. 1. As mentioned, a stabilized image trajectory may be obtained using any of the conventional techniques available. Such techniques include sensor windowing wherein device motion is countered using a 'logical' sliding window within the device sensor area whose extent and position depends upon the detected motion of the device, two-dimensional (2D) image transformation and re-sampling which operates in a similar fashion to the sensor window approach but is slightly more sophisticated in that additional components of device motion (such as rotation for example) are compensated for. It will be apparent to those skilled in the art, that in terms of various described embodiments, any form of stabilization is applicable, and the above are merely intended to serve as suitable examples.

According to the exemplary embodiment depicted in FIG. 1, intentional movement data as determined above is reintroduced into the stabilized sequence. This may occur during the process of stabilization, or after a sequence has been stabilized.

The reintroduction advantageously utilises a smoothing mechanism in the form of a weighting function in order to avoid introducing any discontinuities in the image data as a result of the reintroduction. If a smoothing mechanism were not employed, reintroduced intentional movement data would cause a sharp jump in the images when viewed or played back due to the transition between stabilized image data, and unstabilized intentional movement image data.

Figure 10:
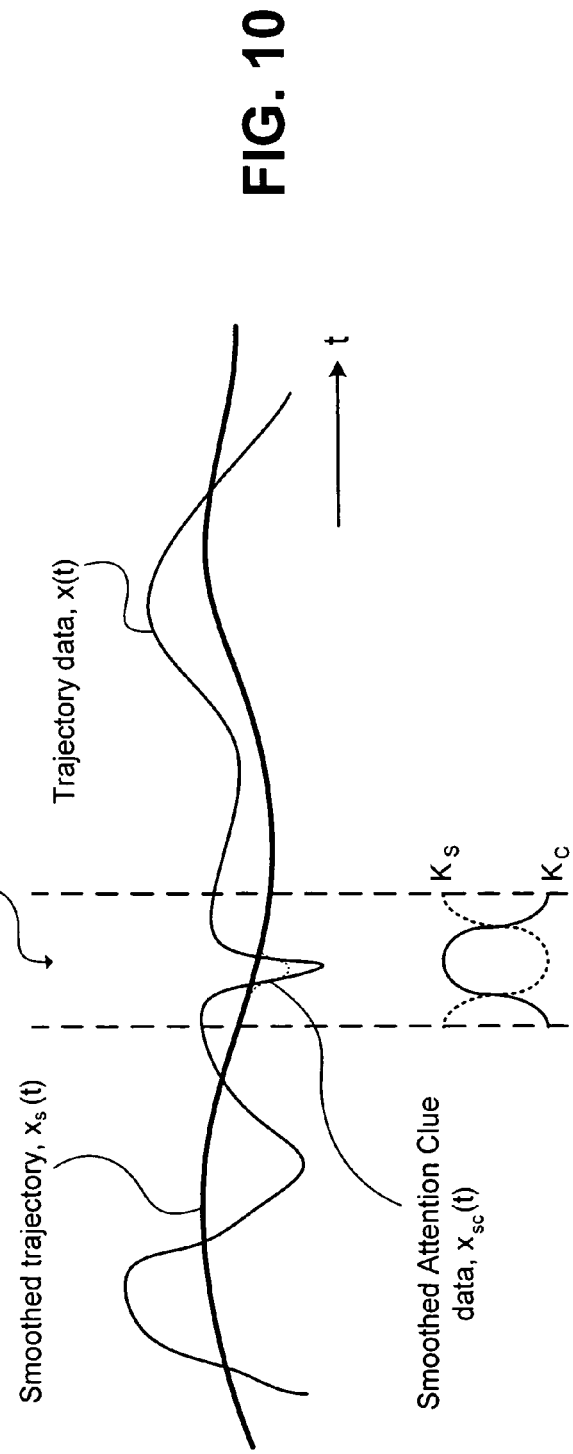
FIG. 10 is a further diagrammatic representation of reintroducing the intentional movement data into the stabilized image sequence.

One exemplary method used to reintroduce the intentional movement data into the stabilized image sequence is represented diagrammatically in FIG. 10 of the accompanying drawings.

Motion of the image capture device in one spatial dimension is represented by x(t). The stabilized trajectory (as stabilized using one of the above-mentioned techniques) is represented by xs(t). At a point in the trajectory x(t) where intentional movement data has been identified 1001, the stabilization procedure is temporarily suspended whilst the intentional movement data is introduced into $x_s(t)$. A weighting function $K_c$ is used in order to introduce the intentional movement data into $x_s(t)$. The function $K_c$ may be, in one embodiment, a Gaussian function (i.e. $\sim\exp(-at^2)$ where a is a constant which may be the temporal width of the intentional movement for example). But, it will be appreciated that any suitably shaped function may be used in order to introduce the intentional movement data into the stabilized trajectory in other embodiments. A further function, $K_s$ $(=1-K_c)$ is defined. During stabilization of the trajectory, and when no intentional movement has been detected, $K_s=1$ and $K_c=0$. Hence, the trajectory is fully stabilized according to one of the above-mentioned techniques, and no intentional movement data is introduced. However, as the area 1001 enters the stabilization process, the functions $K_s$ and $K_c$ vary as depicted in FIG. 10 in order to gradually suspend the stabilization process whilst introducing the intentional movement data. Hence, the area 1001 contains smoothed intentional movement data, xsc as depicted in FIG. 10.

Once the end of the area 1001 is approached by the stabilization process, the functions $K_s$ and $K_c$ vary as depicted in FIG. 10 so as to allow full stabilization of the trajectory with no introduction of intentional movement data, i.e., $K_c$ decreases, and $K_s$ increases.

Accordingly, a video sequence may be stabilized using conventional techniques, but intentional movement data is retained in the video sequence according to the method employed by various embodiments.

Figure 11:
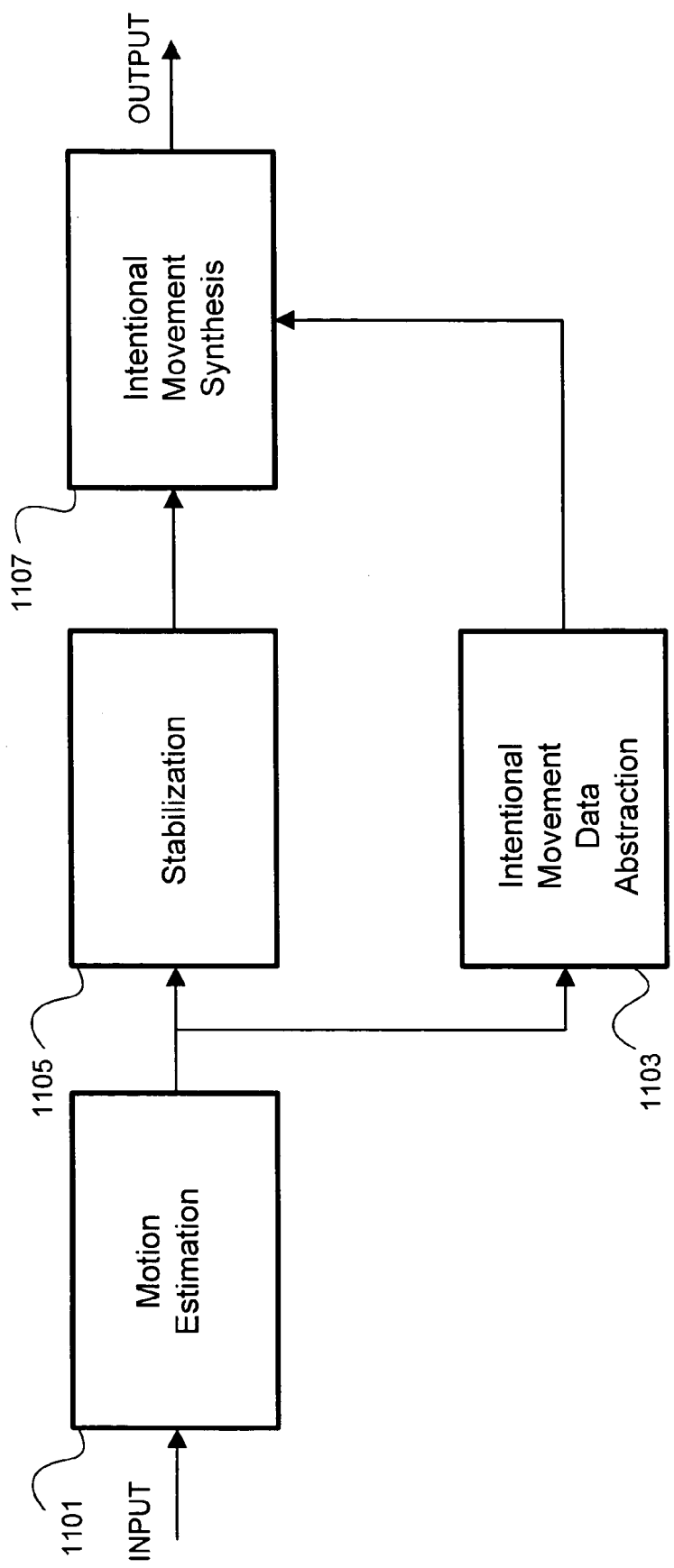
FIG. 11 is a diagrammatic representation of a further embodiment.

According to a further embodiment, as depicted diagrammatically in FIG. 11, intentional movements estimated from the movement extraction module 1103 following motion estimation using the motion estimation module 1101, are passed to an intentional movement data synthesis module 1107 following stabilization in 1105.

The synthesis module 1107 is operable to introduce intentional movement data into a fully stabilized sequence. In this connection, intentional movement data is extracted from the image data in the same fashion as that outlined above. However, in contrast to the above, the intentional movement data is introduced back into the image data only when the video sequence has been fully stabilized. The introduction of the intentional movement data is performed using the method substantially as outlined with reference to FIG. 9 of the accompanying drawings.

Figure 12:
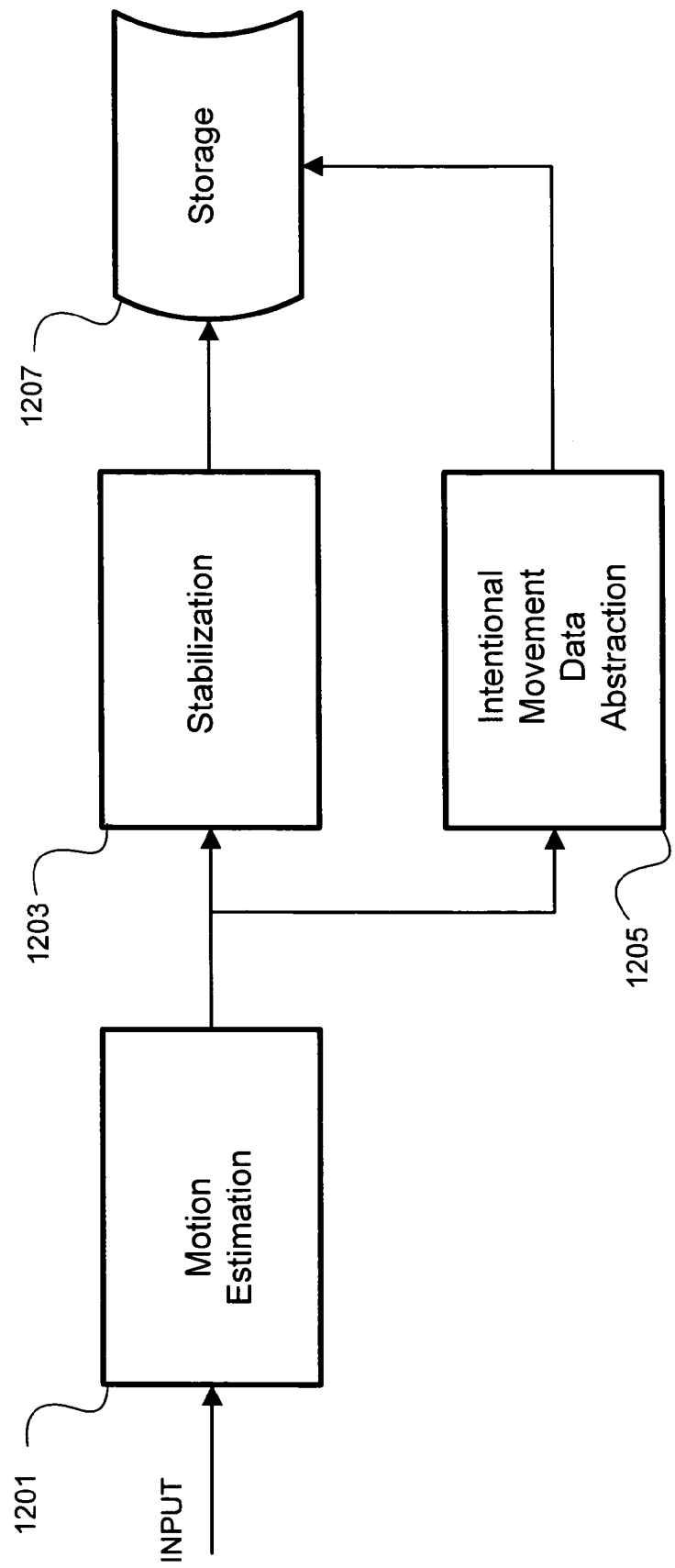
FIG. 12 is a diagrammatic representation of a further embodiment.

In further embodiments, as depicted diagrammatically in FIG. 12, a stabilized video sequence and intentional movement data are obtained as described above, but are stored separately for future combination in storage element 1207. Element 1207 may be the memory of the image capture device, or may be a storage location remote from the image capture device such as that on a user's desktop computer, or in a network storage device, for example. The intentional movement data may be stored as 'image metadata', for example, which may be recombined with a stabilized image sequence when required.

According to another embodiment, intentional movement data may also be enhanced with respect to the original image data. For example, intentional movement data abstracted and reintroduced into a stabilized sequence as described above could be enhanced, either spatially or temporally, prior to or during its reintroduction into the sequence. For example, a spatial enhancement could involve locating the focus of attention in the image sequence at the point where an intentional movement has been detected, and zooming in a predetermined amount in order to emphasise the period of the intentional movement and the captured images at this time.

Figure 13:
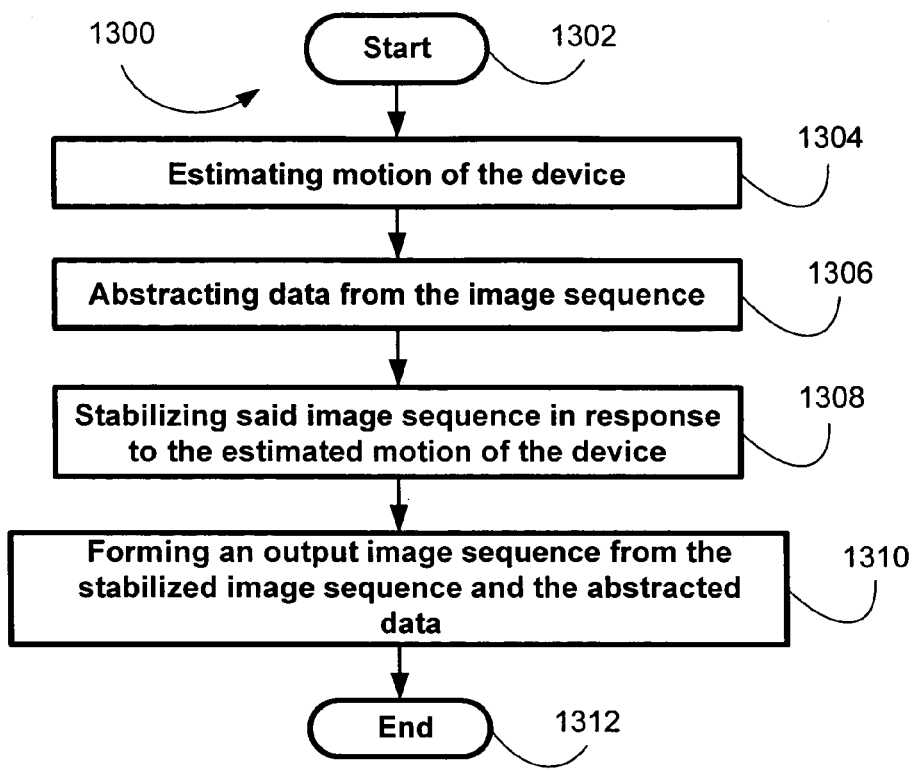
FIGS. 13-15 are a flowcharts illustrating embodiments for processing an image sequence or the like captured by an image capture device.
Figure 14:
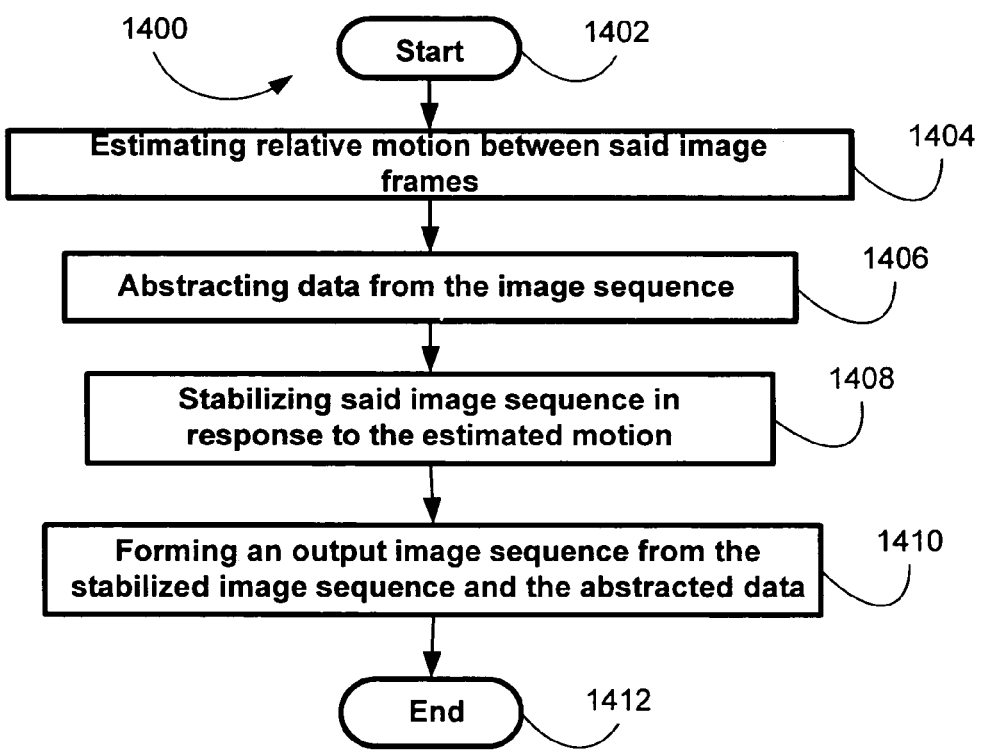
Figure 15:
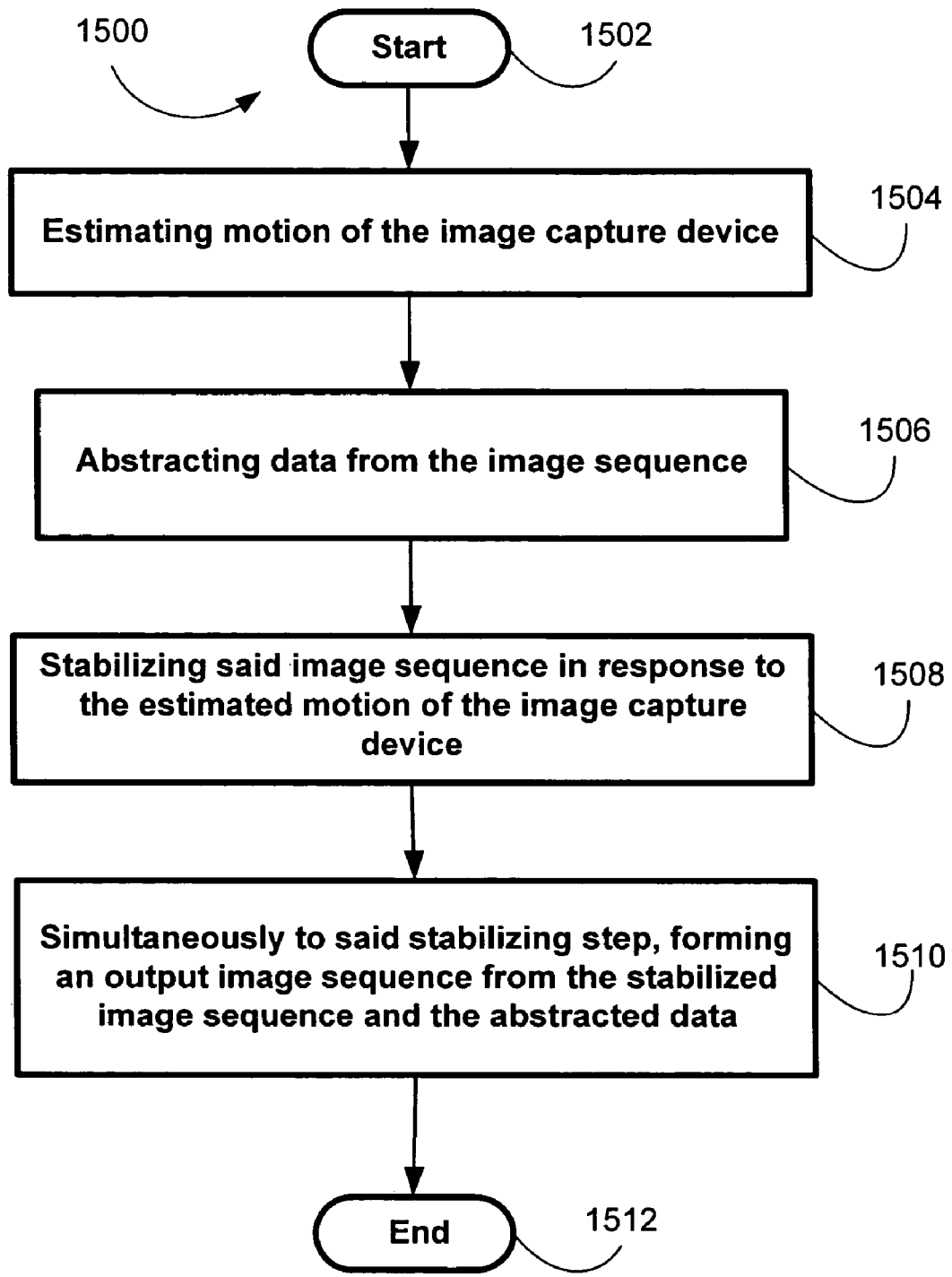

FIGS. 13-15 are a flow charts 1300, 1400 and 1500, respectively, illustrating embodiments for processing an image sequence or the like captured by an image capture device. Alternative embodiments implement the logic of flow charts 1300, 1400 and 1500 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 13-15, or may include additional functions. For example, two blocks shown in succession in FIGS. 13-15 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

FIG. 13 shows a flow chart 1300 for processing an image sequence captured by an image capture device. The process starts at block 1302. At block 1304, motion of the device is estimated. At block 1306, data from the image sequence is abstracted. At block 1308, the image sequence is stabilized in response to the estimated motion of the device. At block 1310, an output image sequence is formed from the stabilized image sequence and the abstracted data. The process ends block 1312.

FIG. 14 shows a flow chart 1400 for processing an image sequence comprising a plurality of image frames. The process starts at block 1402. At block 1404, relative motion between the image frames is estimated. At block 1406, data is abstracted from the image sequence. At block 1408, the image sequence is stabilized in response to the estimated motion. At block 1410, an output image sequence is formed from the stabilized image sequence and the abstracted data. The process ends at block 1412.

FIG. 15 shows a flow chart 1500 for processing an image sequence captured by an image capture device. The process starts at block 1502. At block 1504, motion of the image capture device is estimated. At block 1506, data from the image sequence is abstracted. At block 1508, the image sequence is stabilized in response to the estimated motion of the image capture device. At block 1510, simultaneously to the stabilizing, an output image sequence is formed from the stabilized image sequence and the abstracted data. The process ends at block 1512.

It should be emphasized that the above-described embodiments are merely examples of the disclosed system and method. Many variations and modifications may be made to the above-described embodiments. All such modifications and variations are intended to be included herein within the scope of this disclosure and protected by the following claims.

What is claimed:

1. A method of processing an image sequence captured by an image capture device, the method comprising:
   estimating motion of the device, to determine estimated motion data;
   determining intentional movement data from the estimated motion data;
   stabilizing the image sequence by reducing movement in the image sequence in response to the estimated motion of the device, wherein reducing movement in the image sequence includes reducing the effects of intentional movement on the sequence; and
   forming an output image sequence by combining the determined intentional movement data with the stabilized image sequence.

2. The method as claimed in claim 1, further comprising: providing at least one model associated with the image sequence; and determining, on the basis of the at least one model and the image sequence, the intentional movement data.

3. The method as claimed in claim 2, wherein the at least one model is adapted to model an aspect of the image sequence.

4. The method as claimed in claim 3, wherein determining intentional movement data further comprises performing a probability computation in order to resolve, on the basis of the image sequence and the at least one model, the likelihood that the aspect has occurred in the image sequence.

5. The method as claimed in claim 2, wherein the model is a hidden Markov model.

6. The method as claimed in claim 1, wherein forming the output image sequence further comprises blending the image sequence and the determined intentional movement data using a blending function.

7. The method as claimed in claim 6, wherein the blending function is a Gaussian function.

8. The method as claimed in claim 1, wherein determining the intentional movement data further comprises determining intentional movement of the image capture device.

9. The method as claimed in claim 8, wherein stabilizing the image sequence further comprises extracting the determined intentional movement from the image sequence.

10. The method as claimed in claim 9, wherein forming the output image sequence further comprises introducing the extracted intentional movement back into the output image sequence.

11. The method as claimed in claim 8, wherein determining the intentional movement further comprises comparing the image sequence against a plurality of intentional movement models.

12. The method as claimed in claim 11, wherein the plurality of intentional movement models are a plurality of Hidden Markov Models (HMMs).

13. The method as claimed in claim 11, further comprising determining the plurality of intentional movement models from training image data.

14. The method as claimed in claim 13, wherein the training image data is a pre-captured video sequence which includes a number of intentional movements associated with a scene or object of interest.

15. A method of processing an image sequence comprising a plurality of image frames, the method comprising:
   estimating relative motion between the image frames to determine estimated motion data;
   determining intentional movement data from the estimated motion data;
   stabilizing the image sequence by reducing movement in the image sequence in response to the estimated motion, wherein reducing movement in the image sequence includes reducing the effects of intentional movement on the sequence; and
   forming an output image sequence by combining the determined intentional movement data with the stabilized image sequence.

16. The method as claimed in claim 15, further comprising: providing at least one model associated with the image sequence; and determining, on the basis of the at least one model and the image sequence, the intentional movement data.

17. The method as claimed in claim 16, wherein the at least one model is adapted to model an aspect of the image sequence.

18. The method as claimed in claim 17, wherein determining intentional movement data further comprises performing a probability computation in order to resolve, on the basis of the image sequence and the at least one model, the likelihood that the aspect has occurred in the image sequence.

19. The method as claimed in claim 16, wherein the model is a hidden Markov model.

20. The method as claimed in claim 15, wherein forming the output image sequence further comprises blending the image sequence and the determined intentional movement data using a blending function.

21. The method as claimed in claim 20, wherein the blending function is a Gaussian function.

22. A computer program product for use with a computer, the computer program product comprising:
   a computer useable medium having computer executable program code embodied thereon, wherein the product is operable, in association with the computer, to process an image sequence captured by an image capture device by:
      estimating motion of the device, to determine estimated motion data;
      determining intentional movement data from the estimated motion data;
      stabilizing the image sequence by reducing movement in the image sequence in response to the estimated motion of the device, wherein reducing movement in the image sequence includes reducing the effects of intentional movement on the sequence; and
      forming an output image sequence by combining the determined intentional movement data with the stabilized image sequence.

23. An image capture device, comprising:
- an image sensor that captures image sequence data;
- a motion estimation module that senses motion of the image capture device;
- a central processing device (CPU); and
- a memory having computer executable program code embodied thereon, wherein upon execution of the code by the CPU, the image sequence data is processed by:
  - estimating motion of the image capture device based upon information from the motion estimation module, to determine estimated motion data;
  - determining intentional movement data from the estimated motion data;
  - stabilizing the image sequence data by reducing movement in the image sequence data in response to the estimated motion of the device, wherein reducing movement in the image sequence data includes reducing the effects of intentional movement on the sequence; and
  - forming an output image sequence by combining the determined intentional movement data with the stabilized image sequence data .

24. The image capture device as claimed in claim 23, wherein the motion estimation module further comprises at least one internal sensor that senses the motion of the image capture device.

25. The image capture device as claimed in claim 23, wherein the motion of the image capture device is inferred from the image sequence data using inter-frame displacements.

26. The image capture device as claimed in claim 23, further comprising at least one Hidden Markov Model (HMM) that determines intentional movement data that is extracted from the image sequence data, and wherein the intentional movement data is introduced back into the output image sequence when the output image sequence is formed.

27. The image capture device as claimed in claim 26, further comprising training image data, wherein the training image data is used to determine the HMM.

28. The image capture device as claimed in claim 27, wherein the training image data is a pre-captured video sequence which includes a number of intentional movements associated with a scene or object of interest.

29. The image capture device as claimed in claim 23, further comprising a look-up table having data corresponding to a predetermined set of intentional movements, wherein a rule based scheme determines intentional movement data that is extracted from the image sequence data, and wherein the intentional movement data is introduced back into the output image sequence when the output image sequence is formed.

* * * * *